United States Patent [19]

Schaal et al.

[11] Patent Number: 4,938,303
[45] Date of Patent: Jul. 3, 1990

[54] COOLING AIR CIRCULATION SYSTEM IN THE FRONT END OF A MOTOR VEHICLE

[75] Inventors: Hans Schaal, Esslingen; Thomas Attinger, Stuttgart; Wolfgang Kleineberg, Calw-Stammheim, all of Fed. Rep. of Germany

[73] Assignee: Daimler-Benz AG, Fed. Rep. of Germany

[21] Appl. No.: 383,211

[22] Filed: Jul. 21, 1989

[30] Foreign Application Priority Data

Jul. 23, 1988 [DE] Fed. Rep. of Germany ....... 3825071

[51] Int. Cl.$^5$ ............................................. B60K 11/02
[52] U.S. Cl. ................................. 180/68.1; 123/41.48; 180/68.4; 180/903
[58] Field of Search .................... 180/68.1, 68.2, 68.4, 180/903; 123/41.48, 41.33, 41.31, 41.51, 41.06

[56] References Cited

U.S. PATENT DOCUMENTS

| 3,933,136 | 1/1976 | Burst | 180/68.1 |
| 4,566,407 | 1/1986 | Peter | 180/68.4 |
| 4,702,079 | 10/1987 | Saito | 180/68.4 |

FOREIGN PATENT DOCUMENTS

| 3150152 | 6/1983 | Fed. Rep. of Germany | 180/68.1 |
| 3338466 | 5/1985 | Fed. Rep. of Germany | 180/68.1 |
| 3611713 | 5/1987 | Fed. Rep. of Germany | 180/68.1 |
| 3630646 | 7/1987 | Fed. Rep. of Germany | 180/68.1 |
| 2117721 | 10/1983 | United Kingdom | 180/68.1 |

Primary Examiner—David M. Mitchell
Attorney, Agent, or Firm—Evenson, Wands, Edwards, Lenahan & McKeown

[57] ABSTRACT

The cooling air circulation system at the front end of a motor vehicle has several separate air ducts which are arranged one on top of the other and in which a water cooler and a supplementary cooler are position. Improved cooling is achieved by the cooling air of an upper and central air duct being conveyed to the water cooler, in front of which are mounted in the upper air duct only a condenser of an air-conditioning system and an electric fan, and by a lower air duct, in which the supplementary cooler is arranged, leading into an opening in front of the water cooler on the underside of the front end.

5 Claims, 1 Drawing Sheet

U.S. Patent   Jul. 3, 1990   4,938,303
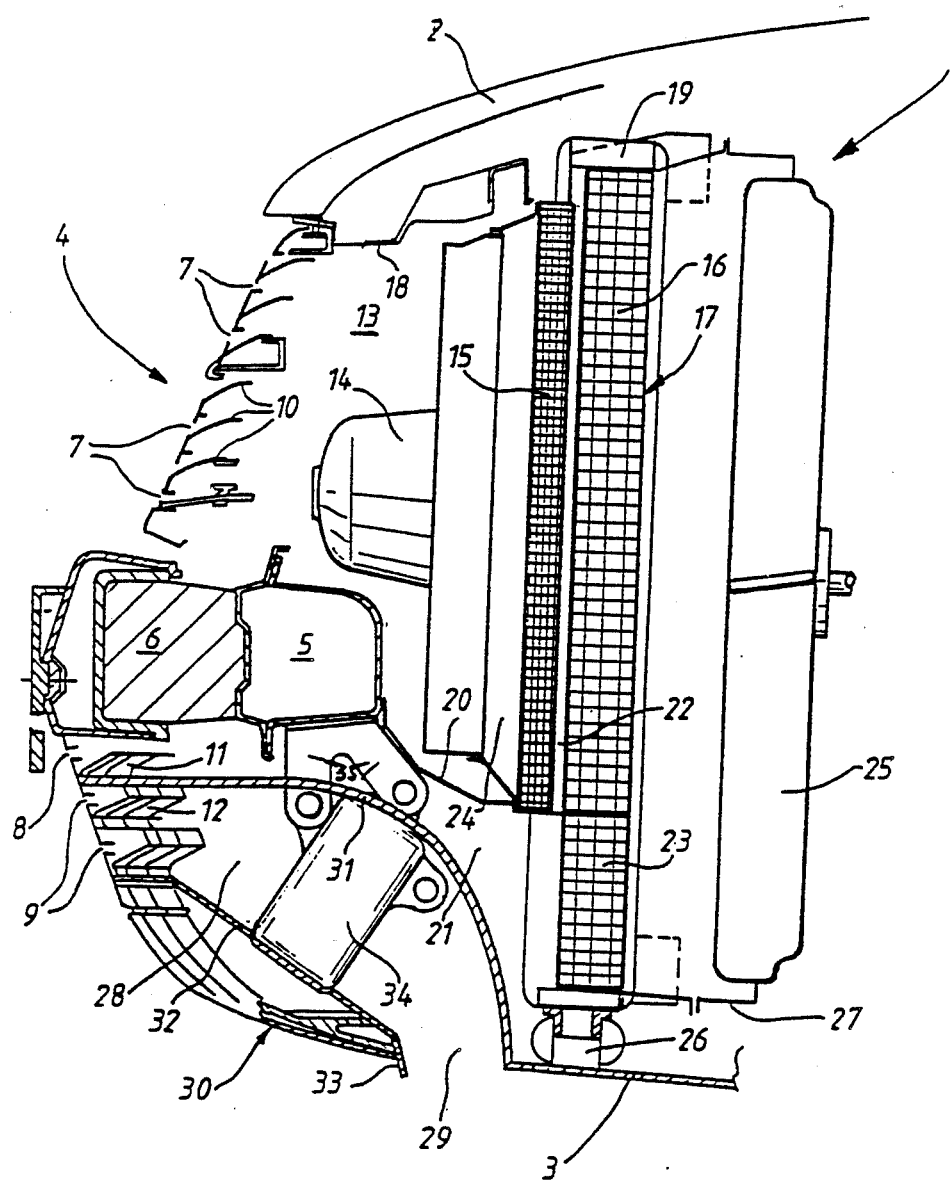

COOLING AIR CIRCULATION SYSTEM IN THE FRONT END OF A MOTOR VEHICLE

BACKGROUND AND SUMMARY OF THE INVENTION

The present invention generally relates to a cooling air circulation system at the front end of a motor vehicle, and more particularly to a system which utilizes the available cross-sectional area at the front end as completely as possible.

A cooling air circulation system at the front end of a motor vehicle is disclosed by German Patent Specification (DE-PS) 33 38 466. In this cooling air circulation system, a lower air duct leads to a water cooler and an upper air duct to a supplementary cooler. This restricts the lower air duct to such an extent that the water cooler, which is acted upon by the cooling air in this lower air duct, at a suitable distance from the end of the front end, can only utilize a part of the height of the front end space.

Accordingly, an object of the present invention is to provide a cooling air circulation system at the front end of a motor vehicle that utilizes the available cross-sectional area at the front end space as completely as possible for the cooling air circulation, with different ventilation possibilities for individual coolers being geared to cooling requirements.

In the cooling air circulation system according to preferred embodiments of the invention, a lower air duct exits into the open in front of a water cooler, and the front end space in the area of the water cooler is occupied to practically its entire height by upper and central air ducts, so that the water cooler which is acted upon by cooling air from these ducts can also extend over this entire height. A condenser connected in front of the upper section of the water cooler is acted upon solely by cooling air, which if necessary is delivered by an electric fan, from the upper air duct, while the cooling air of the central air duct acts solely upon the water cooler, so that adequate cooling of the cooling water is also ensured when there is only inadequate cooling in the upper section of the water cooler as a result of considerable heating up of the cooling air in the condenser.

Sealing of the air ducts with respect of one another and from the outside eliminates cooling air loss by leakage, and sealing of the cooling air flow between the electric fan and the water cooler by the fan cowl prevents a return flow of the cooling air delivered by the electric fan. Both measures render possible optimum utilization of the cooling air, by means of which an improvement of the water cooling and the air-conditioning as well as a smaller design of the cooler surfaces and of the fan drive are achieved.

The one embodiment of the cooling air circulation system wherein an additional fan is arranged down stream from water cooler renders possible cooling of both the water cooler and the condenser independently of the speed of the motor vehicle and of the activity of the electric fan, the space necessary for the fan driven by the internal combustion engine remaining the same, in spite of the increased number of coolers, as a result of the favorable utilization of the space available in the front end.

Due to the advantageous placement of the front bumper with respect to the air inlet ducts, the best possible by-passing of the bumper by the air ducts is achieved. Each air duct can be assigned an inlet surface which corresponds to its cross-section in the cooler area. All the inlet opening lie in the compression area in the wall of the front end, by virtue of which the cooling air delivery is supported.

The advantageous placement of a spoiler at the outlet of the lower air duct increases the low pressure at the outlet opening of the lower air duct, so that the flow through it is ensured without fan support also.

Other objects, advantages and novel features of the present invention will become apparent from the following detailed description of the invention when considered in conjunction with the accompanying drawings.

BRIEF DESCRIPTION OF THE DRAWINGS

The invention is described more closely below with reference to an exemplary embodiment which is shown in the drawing.

DETAILED DESCRIPTION OF THE DRAWING

The front end space 1 of a motor vehicle (not shown further), driven by a water-cooled internal combustion engine, is essentially delimited by an engine cowl or hood 2, a floor panel 3 and a front wall of the front end 4, in which a bumper 6 supported by a cross member 5 is integrated. In the wall of the front end 4, above and below the bumper 6, there are inlet openings 7,8,9 for cooling air, which are adjoined by air guide baffles 10, 11, 12. The inlet openings 7 above the bumper 6 lead into an upper air duct 13, which extends in the direction of the air flow in the shape of a funnel and also includes the space behind the cross member 5.

In the upper air duct 13 in the direction of the air flow there are, one behind the other, an electric fan 14, a condenser 15 of an air-conditioning system (not shown further) and an upper section 16 of a water cooler, or radiator 17 for cooling the cooling water for the internal combustion engine. The upper air duct 13 is sealed all around between the wall of the front end 4 and the water cooler 17, in which connection, in addition to lateral walls, in particular a top wall 18 extends close under the engine cowl 2 between the wall of the front end 4 and the upper bearing 19 of the water cooler 17. The lower limit of the upper air duct 13 is formed by the bumper 6, the cross member 5 and a partition wall 20 which adjoins the latter and separates off a central air duct.

Additionally, there is fastened to the condenser 15 a fan cowl 24 for the electric fan 14. The fan cowl 24 encloses the condenser 15 tightly and, after sealing of the gap 22 between condenser 15 and water cooler 17, separates the upper section 16 of the water cooler 17, from its lower section 23 positioned in the central air duct 21. These measures prevent losses by leakage and return flows of the cooling air, so that an optimum utilization of the cooling air flowing in is ensured.

The cooling air which flows in through the inlet openings 8 below the bumper 6 into the central air duct 21 acts exclusively upon the lower section 23 of the water cooler 17, so that a minimum cooling of the cooling water is ensured independently of a reduction and preheating of the cooling air due to obstruction by other coolers and further obstacles. A fan 25 which is driven by the internal combustion engine and located downstream of the water cooler 17 and which acts uPon the entirety of the latter, ensures cooling air circulation even at low vehicle speeds. Leakage losses are prevented by a fan cowl 27 which is fastened on the upper 19 and lower 26 water cooler bearings. The central air duct 21 extends in the direction of flow in the shape of a funnel directed substantially downwards as far as the area of the floor panel 3, so that the water cooler 17 including the bearings 19, 26 can utilize the full height of the front end space between the engine cowl 2 and the floor panel 3.

The inlet openings 9 for a lower air duct 28 lie directly under the inlet openings 8 at the wall of the front end 4. The lower air duct 28 bends downwards in the direction of the air flow and exits from the front end space through an outlet opening 29 located in front of the water cooler 17 in the intermediate area between the floor panel 3 and a front end apron 30. The air duct 28 is sealed all around like the two other air ducts 13, 21 and namely in particular in its upper and rear area by a curved partition wall 31 against the central air duct 21 and at its lower area by an angled wall 32 at the front end apron 30. This wall 32 is extended downwards beyond the outlet opening 29 so that it forms a spoiler 33, which increases the low pressure in the outlet opening 29 and consequentlY promotes the cooling air flow in the air duct 28.

The cooling air acts exclusively upon a supplementary cooler 34 such as a motor oil cooler or charge cooler which is arranged at an angle in the air duct 28 and fastened by means of brackets 35 to the cross member 5.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A cooling air circulation system at a front end of a motor vehicle having a water cooled internal combustion engine, a water cooler, and a supplemental cooler comprising:

an upper duct sealed at its sides and extending from upper inlet openings at a wall of the front end to an upper section of the water cooler;

a condenser of an air conditioning system positioned in front of the upper section of the water cooler and an electric fan positioned in front of the condensor arranged in the upper duct;

a fan cowl of the fan extending to the water cooler and tightly enclosing the fan and condenser;

a central duct sealed at its sides and extending from central inlet opening at the wall of the front end to a lower section of the water cooler, cooling air of the central duct flowing exclusively through the lower section of the water cooler;

and a lower duct sealed at its sides and extending from lower inlet opening to an outlet opening which lies in front of the water cooler at an underside of the front end, the supplemental cooler being arranged in the lower duct.

2. A cooling air system according to claim 1, wherein the supplemental cooler is at least one of a motor oil cooler and a charge cooler.

3. A cooling air circulation system according to claim 1, wherein a fan is arranged downstream of the water cooler, which is driven by the internal combustion engine and which acts upon the entire water cooler.

4. A cooling air circulation system according to claim 1, wherein the upper inlet openings of the upper air duct lie above a bumper and the central and lower inlet openings of the central and lower air ducts lie below a bumper.

5. A cooling air circulation system according to claim 1, wherein a front edge of the outlet opening of the lower air duct is a spoiler.

* * * * *